(12) United States Patent
Y Hu (10) Patent No.: US 10,160,681 B2
(45) Date of Patent: Dec. 25, 2018

(54) SUPER-LARGE SCALE PHOTON CAPTURE BIOREACTOR FOR WATER PURIFICATION AND OPERATION METHOD THEREFOR

(71) Applicant: PHOTON ECO-CAPTURE PTY LTD, Wuhan (CN)

(72) Inventor: James Y Hu, Wu Han (CN)

(73) Assignee: PHOTON ECO-CAPTURE PTY LTD, Wuhan (CN)

( * ) Notice: Subject to any disclaimer, the term of this patent is extended or adjusted under 35 U.S.C. 154(b) by 0 days.

(21) Appl. No.: 15/247,949

(22) PCT Filed: Feb. 28, 2015

(86) PCT No.: PCT/CN2015/073453
§ 371 (c)(1),
(2) Date: Aug. 26, 2016

(87) PCT Pub. No.: WO2015/127904
PCT Pub. Date: Sep. 3, 2015

(65) Prior Publication Data
US 2018/0037482 A1    Feb. 8, 2018

(30) Foreign Application Priority Data
Feb. 28, 2014  (CN) .......................... 2014 1 0072754

(51) Int. Cl.
*C02F 3/32* (2006.01)
*A01K 63/04* (2006.01)
(Continued)

(52) U.S. Cl.
CPC ................ *C02F 3/327* (2013.01); *A01G 7/02* (2013.01); *A01G 7/045* (2013.01); *A01G 31/02* (2013.01);
(Continued)

(58) Field of Classification Search
CPC ....... C02F 3/327; A01K 63/045; A01K 61/10; A01G 7/045; A01G 7/02; A01G 31/02
(Continued)

(56) References Cited

U.S. PATENT DOCUMENTS 5,137,625 A    8/1992   Wolverton
6,190,553 B1   2/2001   Lee
(Continued)

FOREIGN PATENT DOCUMENTS

CN    102287741 A    12/2011
CN    103395930 A    11/2013
(Continued)

*Primary Examiner* — Fred Prince
(74) *Attorney, Agent, or Firm* — ScienBiziP, P.C.

(57) ABSTRACT

A super-large scale photon capture bioreactor for water purification and aquaculture, includes a sealable three-dimensional room. Circuitous water ditches (2) at each layer inside the room. The water ditches (2) within a layer includes an inlet (12) and an outlet (13). A plurality of filter units (4) are at intervals in water ditches (2) at each layer. Float-planted plants (5) are on water surface of each filter unit, aquatic animals (6) and microorganisms (7) are underwater, and plant growth illustrating lights (8) are above float-planted plants (5) at adjustable height. A vane wheel (15) connecting a generator (16) is under an outlet (13) of an upper layer. A water inlet (12) of a next layer is under the vane wheel (15). Water to be purified is guided to an inlet (12) at an uppermost layer. The bioreactor is in low energy consumption, less occupied area, no pollution and clean production.

10 Claims, 6 Drawing Sheets

(51) Int. Cl.
    *A01K 61/10*     (2017.01)
    *C02F 1/00*     (2006.01)
    *A01G 7/02*     (2006.01)
    *A01G 7/04*     (2006.01)
    *A01G 31/02*     (2006.01)
    *A01G 31/00*     (2018.01)

(52) U.S. Cl.
    CPC ............ *A01K 63/04* (2013.01); *A01K 63/045* (2013.01); *A01G 31/00* (2013.01); *A01K 61/10* (2017.01); *C02F 1/001* (2013.01); *C02F 2209/001* (2013.01); *C02F 2209/40* (2013.01); *C02F 2303/10* (2013.01); *Y02W 10/18* (2015.05); *Y02W 10/30* (2015.05); *Y02W 10/37* (2015.05)

(58) Field of Classification Search
    USPC .................................. 210/602, 603, 252, 259
    See application file for complete search history.

(56) References Cited

U.S. PATENT DOCUMENTS

| | | |
|---|---|---|
| 2004/0259239 A1 | 12/2004 | Branson |
| 2005/0064577 A1 | 3/2005 | Berzin |
| 2007/0048859 A1 | 3/2007 | Sears |
| 2008/0135474 A1 | 6/2008 | Limcaco |
| 2008/0274494 A1* | 11/2008 | Kertz ................ A01G 7/02 435/29 |
| 2010/0003741 A1* | 1/2010 | Fromson ............ B01D 53/62 435/262.5 |
| 2016/0095301 A1 | 4/2016 | Carman |
| 2016/0270304 A1* | 9/2016 | Higgins ............. A01G 9/12 |
| 2017/0013810 A1* | 1/2017 | Grabell ............. A01G 31/06 |

FOREIGN PATENT DOCUMENTS

| | | |
|---|---|---|
| DE | 3819508 A1 | 12/1989 |
| DE | 102007017933 A1 | 10/2008 |
| JP | 58199099 A | 11/1983 |
| JP | 62125898 A | 6/1987 |
| JP | 10-327701 A | 12/1998 |
| JP | 11333482 A | 12/1999 |
| JP | 2000037144 A | 2/2000 |
| JP | 2003023887 A | 1/2003 |
| JP | 2004276011 A | 10/2004 |
| JP | 2011094522 A | 5/2011 |
| JP | 2012504942 A | 3/2012 |
| JP | 2014000057 A | 1/2014 |
| KR | 20060017211 A | 2/2006 |
| WO | 2008008262 A2 | 1/2008 |
| WO | 2009066231 A2 | 5/2009 |

* cited by examiner

SUPER-LARGE SCALE PHOTON CAPTURE BIOREACTOR FOR WATER PURIFICATION AND OPERATION METHOD THEREFOR

TECHNOLOGY FIELD

The present invention generally relates to bioreactors, and particularly to Large Scale Photon Capture Bioreactor (LSPECBR) for water purification.

BACKGROUND OF THE INVENTION

The Bioreactor is a biological engineering technology began in 1980s, and refers to any manufacturing device or engineering device for providing biological activity environment. The bioreactors are devices or systems use biological functions of bio-organisms, to obtain target products, cells, tissues and organs, etc. by biochemical reaction or biological metabolism in vitro or in vivo, and are reactors related to biological or biochemical active material production out of the reaction process by specific biological. These bioreactors generally in cylindrical shape and the volume ranges of from a few liters to several cubic meters, and generally made up of stainless steel.

The bioreactor technology has gone through three stages: bacterial bioreactors, cell bioreactors and transgenic bioreactor. The transgenic bioreactors are divided in transgenic animal bioreactors and transgenic plant bioreactors. The transgenic plant bioreactors are mostly configured for improving plant varieties. The transgenic animal bioreactors are configured for improving animal varieties, while often configured for producing high value-added pharmaceutical products and protein nowadays.

In application of water treatment, the bioreactor is mainly membrane bioreactor (MBR). Membrane bioreactor is a sewage treatment and reuse technology combined with biodegradable effect and efficient membrane separation technology. Membrane bioreactor commonly employs organic film, common film material is polyethylene, polypropylene, etc., hollow fiber membranes and flat membranes are employed to make micro-filtration membrane, ultrafiltration membranes and reverse osmosis membranes and the like. A monomer membrane bioreactor is generally tubular-structured, and mainly consists of two parts of membrane separation module and biological reactor. In use, a number of monomer membrane bioreactors are connected in series or in parallel, or a combination of both, to form a system, activated sludge and macromolecules in the biochemical reaction tank of a sewage treatment plant are entrapped by using of a membrane separation device, a secondary sedimentation tank is eliminated. The Membrane bioreactor is actually a general term for three reactors: (1) aeration membrane bioreactor (AMBR); (2) extractive membrane bioreactor (EMBR); (3) solid-liquid separation membrane bioreactor (SLSMBR). Compared with some traditional biological treatment processes, the membrane bioreactor has major advantages of higher effluent quality and stability, less excess sludge, small floor space, and higher removal efficiency of ammonia nitrogen and refractory organics, however, on the other hand, the membrane bioreactor also has major disadvantages of higher cost, membrane fouling and membrane plugging, inconvenience for operation and management, higher energy consumption, and higher maintenance cost. Thus, the membrane bioreactor is generally used in sewage treatment plants which has high requirement on effluent quality, and less sewage to be treated, such as sewage user's daily sewage treatment, reuse of remote living quarters, hotels, resorts, schools, offices and other decentralized organic which are difficult to be collected by municipal sewage pipe network, and organic sewage treatment of industries of beer, leather, food and chemical, etc. The defects of the membrane bioreactor induced that it is difficult to popularly apply to large-scale sewage treatment plants.

Up to now, traditional sewage treatment technologies either consume large amount of energy source, or occupy large area. The traditional treatment process becomes a heavy burden.

In addition, the cleanliness of drinking water directly affects the health of the general public. The existing main problem of drinking water in high oxygen consumption. High oxygen consumption means that too much organic matters involved in drinking water. Under current technical conditions, removing the organic matters is generally by putting chlorine into the water for water purification. But the water disinfection will increase by-products which can increase mutagenic activity of water, thus having a long-term negative impact on human health. Features of harm of the organic matters on health often are lagging. It often taken 20~30 years from harm being done on human health by the organic matters to human being found sick. For sewage treatment, one fundamental drawback of the traditional processing method is utilizing equipment with high energy consumption to resist potential energy and resources in the water. In traditional aerobic biological treatment processes, contaminants may volatilize easily along with the aeration air flow, gas stripping phenomenon occurs, so that not only the treatment effect is very unstable, but also cause air pollution. Adding oxygen using physical methods, flocculation and sedimentation using chemical methods, biological anaerobic reaction or aerobic reaction method are used to treat one cubic meter of sewage will result in a very high energy consumption. Statistical data showing that, in the United States 7% to 8% of the electricity are consumed by 25,000 sewage treatment plants and 18,000 sewage sludge treatment facilities. If wastewater is treated according to the American model, China is expected to build 4.5 sewage treatment plants and 30,000 sewage sludge treatment plants up to 2040 following the current process of urbanization. At that time, energy consumption on sewage treatment will become a heavy burden. A new small wetland wastewater treatment technology with relatively low energy consumption is spread at China's villages and towns. However, this technology encountered greater resistance due to large occupied area and limited decontamination capacity.

Drinking water purification and sewage treatment have problems in four areas:

1) Huge energy consumption resulting in unsustainability;
2) Even if all of the processing in accordance with the requirements of discharge standards, diluted ecological water no longer exists;
3) The high cost of wastewater treatment become a lifelong burden on the general public.
4) Purification and treatment taking up a lot of land but not to create economic wealth, squeezing the living space.

SUMMARY OF THE INVENTION

What this present invention desired to resolved is to provide a large scale photon capture bioreactor for water purification and an operation method thereof. The large scale photon capture bioreactor can convert a process for treatment of all kinds of organic swage and water purification to a process of creating economic benefits and power source with little floor area and at very low cost.

In order to resolve aforementioned technology problems, the present invention provides a super-large scale photon capture bioreactor for water purification. The super-large scale photon capture bioreactor for water purification includes a sealable three-dimensional room, a water pipe, a vane wheel, and a generator. There are a plurality of planar layers inside the three-dimensional room, each being mounted with water ditches in a circuitous way. The water ditches in a same planar layer includes a water inlet and water outlet. A plurality of microbe filter diaphragms are arranged at intervals in the water ditches, and a filter unit is formed between each two adjacent microbe filter diaphragms. Float-planted plants are provided on water surface of each filter unit, microorganisms and aquatic animals are provided underwater, and plant growth illustrating lights are arranged above the float-planted plants at an adjustable height. A vane wheel is arranged under a water outlet of the water ditches in an upper layer and is connected with the generator. A water inlet of the water ditches in a next layer is arranged under the vane wheel. Water to be purified is guided to a water inlet at an uppermost layer through the water pipe.

A drop sink is arranged between two adjacent planar layers. An upper end of the sink is connected with a water outlet of an upper layer, and the vane wheel is arranged under a lower end of the sink.

A pump is provided for driving water to be purified in a water pool to the water inlet of the uppermost layer through the water pipe.

The super-large scale photon capture bioreactor further includes carbon dioxide supply pipes communicating with the three-dimensional room.

Each planar layer is relatively closed and is constructed with a retractable natural ventilation orifice.

Alternatively, aquatic animals are bred underwater in the filter units. The structure of the filter unit is determined based on concentration of organic pollutants in the water to be purified. If the concentration of organic pollutants in the water to be purified is relatively high, the filter unit is not suit for breeding aquatic animals. However, the filter unit can be constructed as artificial wetland, which can equivalent to thicken the microbe filter diaphragms so as to degrade rapidly organic pollutants in the water to allow the water suitable for growth of aquatic animals.

The sink is gradually narrowed from top to bottom.

The super-large scale photon capture bioreactor further includes a plurality of biogas digesters and biogas generator sets at a ground layer.

Solar power systems and wind power systems can be arranged outside a sunny side of the bioreactor and at a top surface of the bioreactor.

A sewage regulation pool with anti-leakage measures is arranged at a subterranean lay of the bioreactor, and swage is physically filtered by a barrier before entering the sewage regulation pool.

The water ditches have a width of about 1.1-1.3 m.

An operation method of the super-large scale photon capture bioreactor includes: water to be purified is diluted to a predefined concentration in a sewage regulation pool. The water in the sewage regulation pool is driven to pass through the water pipe to the water inlet at an upmost layer inside the dimensional room by a pump and then to enter the water ditches in a circuitous configuration and to flow in the water ditches. After the water to be purified passes through the filter units sequentially at the upmost layer, the water to be purified is gradually filtered by the filter units. Then the water to be purified flows from a water outlet of the last filter unit to enter an upper end of a drop sink, drops down the drop sink and pushes the vane wheel to rotate at a lower end of the sink. Rotation of the vane wheel drives the generator to generate power to be supplied to the plant growth illuminating lights. After passing through the vane wheel, the water to be purified enters a water inlet at a next layer. And so on, the water to be purified being turned into purified water after passing through ditches at a lowest layer. Float-plants plants at each filter unit, and the float-planted plants acts photosynthesis under illumination of the plant grown illuminating lights to absorb part of nutrient substance and carbon dioxide in air. The microorganism utilizes part of nutrient substance in the water to perform biological reaction. Aquatic animals eat parts of roots of the float-planted plants and phytoplankton in the water. At the same time when the water is purified, plants capable of being harvested and the aquatic animals are obtained.

When the main object of the bioreactor is to purify water, the main product is purified water, while some harvested creatures are by-products, even though economic value of the by-products in the current circumstances would be greater than the main product to some extent. When the main object of the bioreactor is for aquaculture and float-planting plants, land output in unit can be increased by more than 100 times comparing with traditional methods. Advantages of the present invention is as follows:

1. Easy to control, stable quality. All factors and configurations participating in biological reaction inside the bioreactor are can be easy controlled. Strengthening measures are taken to promote biological reaction to improve reaction efficiency. Under common circumstances, operation of the bioreactor is characterized in little influence from environment and stable product quality. Water flow and flow rate of the water to be purified is under controlled; water and float-planted plants, aquatic animals are arranged inside a sealable room free from environment influence.

2. Intensification, less occupied area, low cost. Since multi-layered structure of the super-large scale photon capture bioreactor achieves a goal of intensification, the occupied area is reduced by more than 70 percent, and cost for capital construction is saved by 30 percent. If the super-large scale photon capture bioreactor is used for aquaculture, land output in unit can be increased by more than 100 times comparing with traditional fishpond, and the quality of aquatic animals will be better than the traditional fishpond.

3. Low energy consumption. During operation of the super-large scale photon capture bioreactor, no high energy consumption equipment is needed, except for a pump being used to lift the water to a predefined height. In addition, biological reaction process inside the bioreactor can output energy source for self-supplement. Comparing with traditional methods for treating domestic swage, the bioreactor can reduce energy consumption by more than 90 percent.

4. No pollution, clean production. Microorganism, aquatic plants and aquatic animals are utilized for biological reaction, no extra abiotic things is added in the biological reaction, and outputs can be fully utilized.

5. Remarkable economic benefits. Since the light illustrated on the plants is in a sealable room and is easy to be controlled, so as to improve efficiency of photosynthesis tremendously. The bioreactor includes carbon dioxide inlets for being supplied with carbon dioxide so as to prompt photosynthesis and growth of organism inside the bioreactor; fast growth of the organism inside the bioreactor accelerates water purification. The organism (including roots of the plants) inside the bioreactor can be harvested, and parts of harvested organism can be utilized for power generation to supplement power required by the bioreactor itself. Plants and animals which is capable of being harvested inside the bioreactor, especially those in relatively purified water during later phase of the water purification, having high economic values. Thus, an ecological production industry with high economic values is formed.

The super-large scale photon capture bioreactor can be widely used. The super-large scale photon capture bioreactor not only can be used for water purification, but also can be used for domestic sewage treatment, high eutrophication sewage treatment, deep purification of tail water of traditional sewage stations, purification of organic sewage from all kinds of industry production processes, and super-large scale aquaculture and soilless culture, and so on.

BRIEF DESCRIPTION OF THE DRAWINGS

A better understanding of the features and advantages of the present invention will be obtained by reference to the following detailed description and the accompanying drawings of which.

DETAILED DESCRIPTION OF THE INVENTION

Referring to FIG. 1, FIG. 2, FIG. 3 and FIG. 4, a super-large scale photon capture bioreactor includes a sealable multi-layers structured room which includes multiple plane biological reaction layer. At each biological reaction layer, a water ditch 2 with a depth about 1.2 m is arranged. The water ditch 2 can be configured to allow water flow slowly in a roundabout way. The water ditch 2 can be divided into a plurality of filter unit 4 by microbe filter diaphragms 3. There are specially-selected plants 5 are float-planted on the water surface of each filtering unit 4, and aquatic animals 6 and microorganisms 7 are scattered among plant roots and microbe filter diaphragms.

Plant growth illuminating lights 8 with an adjustable height are suspended above the float-planted specially-selected plants 5. Water to be purified 9 is transported through a water pipe 11 by a pump 10 to enter a water inlet 12 of the first biological reaction layer within the sealable multi-layers structured room and then enter the water ditch 2 to flow slowly. After purified successively by each filter unit 4 of the first biological reaction layer, the water to be purified 9 flows into a water outlet 13 of the last filter unit 4 of the first biological reaction layer and then flows down through an inclined sink 14. The sink 14 is gradually narrowed from top bottom. A vane wheel 15 is mounted at the lower end of the sink 14. The vane wheel 15 is connected to an electric generator 16 and configured to drive the generator 16 to generate electricity. The water to be purified 9 flowing down the sink 14 can push the vane wheel 15 to rotate, so as to drive the generator 16. Then the water to be purified 9 enters a water inlet 12 of a next biological reaction layer to continue filtering and purifying which is similar with those in the first biological reaction layer.

The super-large scale photon capture bioreactor can include carbon dioxide supply pipelines which supply carbon dioxide to each biological reaction layer. A plurality of biogas digester 18 and biogas generator set 19 can be provided in the first biological reaction layer. A solar power system and a wind turbine system 20 can be provided at an outer surface of the super-large scale photon capture bioreactor or a top surface of the super-large scale photon capture bioreactor. Each biological reaction layer can include a retractable natural ventilation orifice 21. A basement level of the super-large scale photon capture bioreactor is a sewage regulation pool 22. Before flowing into the sewage regulation pool 22, water can be physically filtered by a barrier 23.

Figure 1:
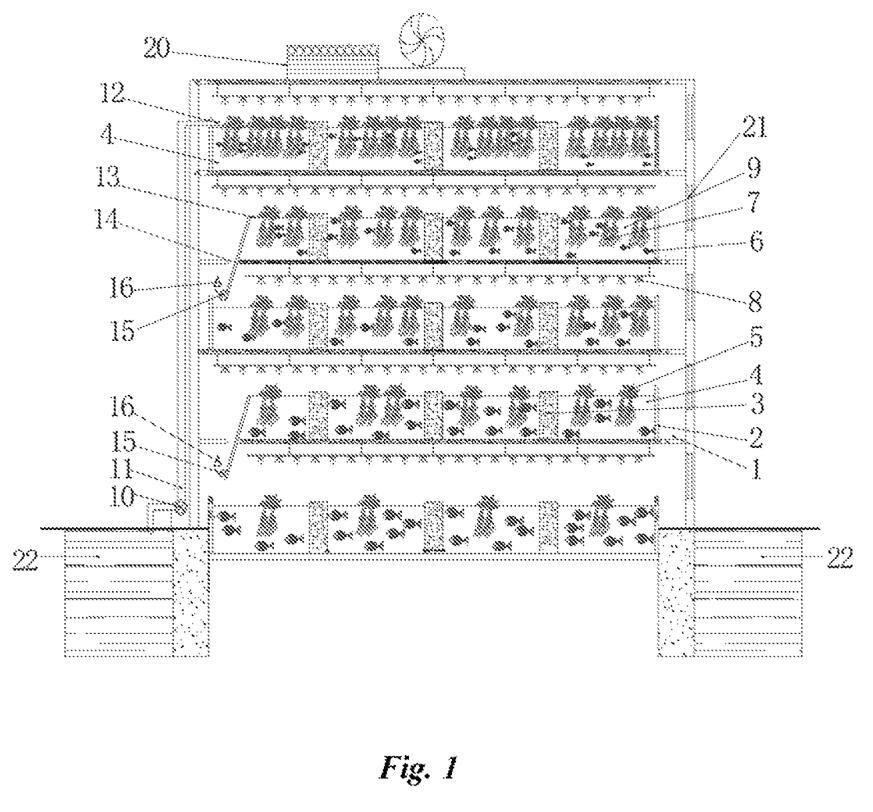
FIG. 1 provides a back view of a super-large scale photon capture bioreactor, in accordance with embodiments.
Figure 2:
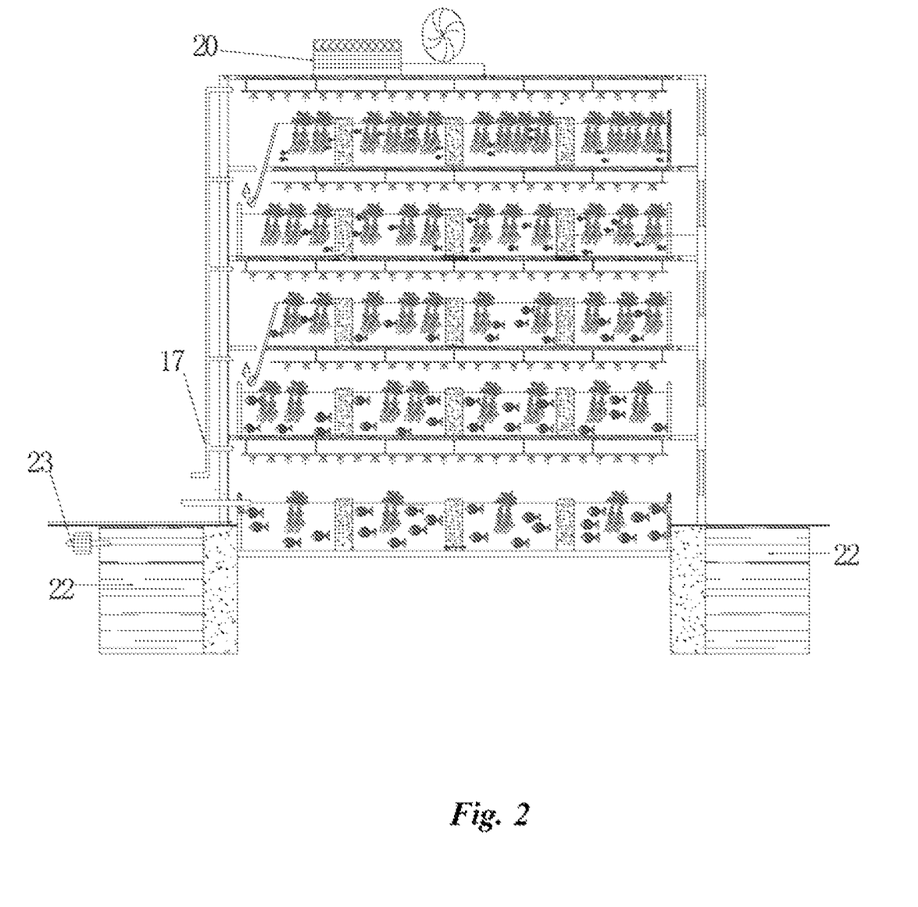
FIG. 2 provides a front view of the super-large scale photon capture bioreactor, in accordance with embodiments.
Figure 3:
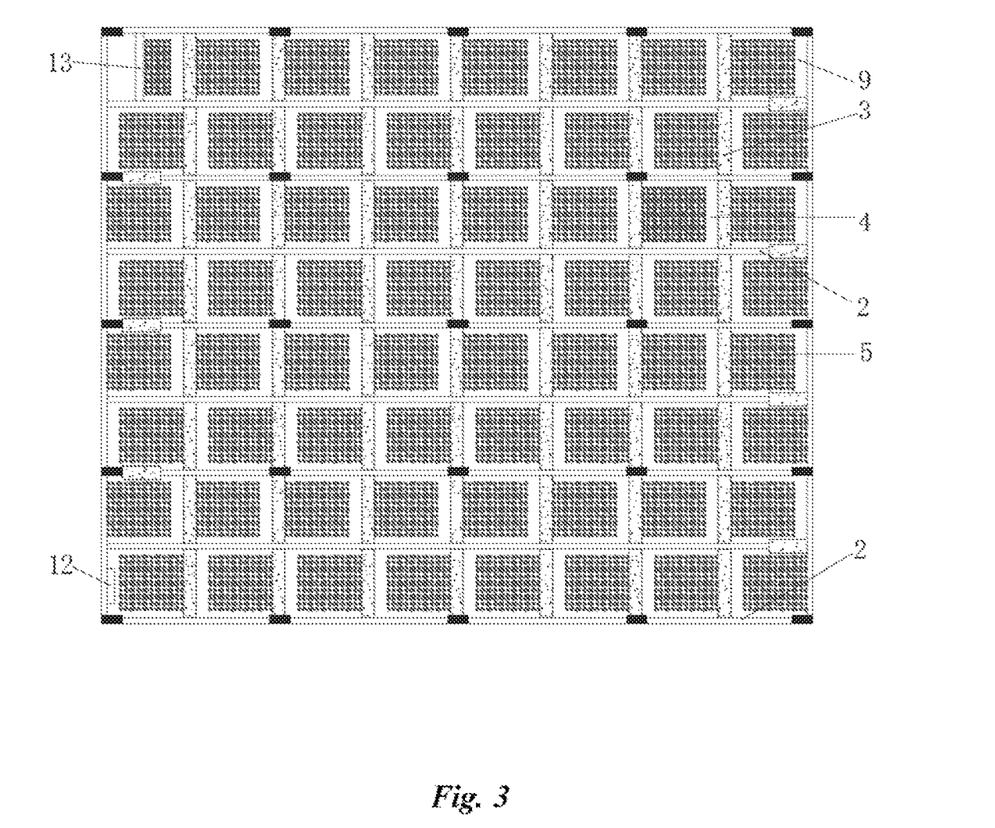
FIG. 3 provides a plan view of one layer of the super-large scale photon capture bioreactor, in accordance with embodiments.
Figure 4:
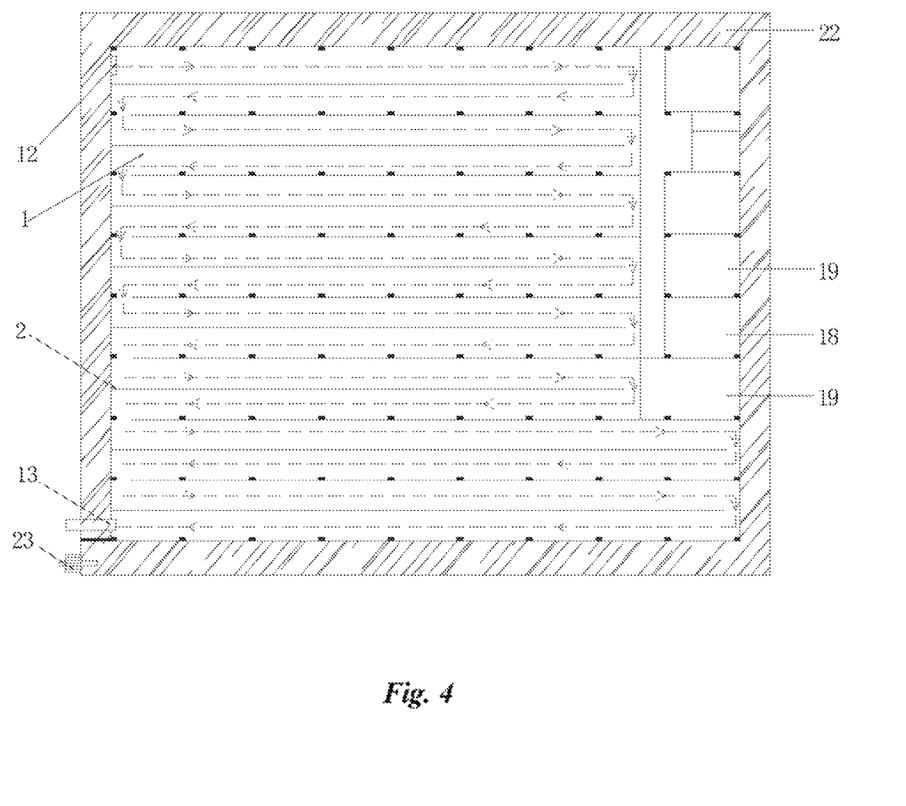
FIG. 4 provides a plan view of a first layer of the super-large scale photon capture bioreactor, in accordance with embodiments.
Figure 5:
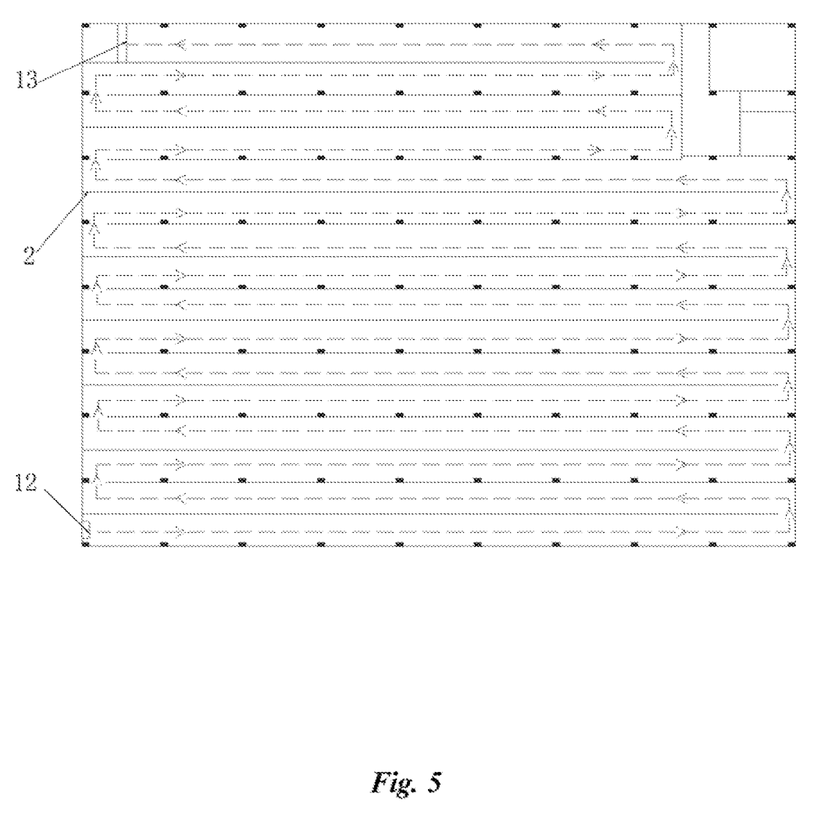
FIG. 5 provides a plan view of one of even layers of the super-large scale photon capture bioreactor, in accordance with embodiments, in accordance with embodiments.
Figure 6:
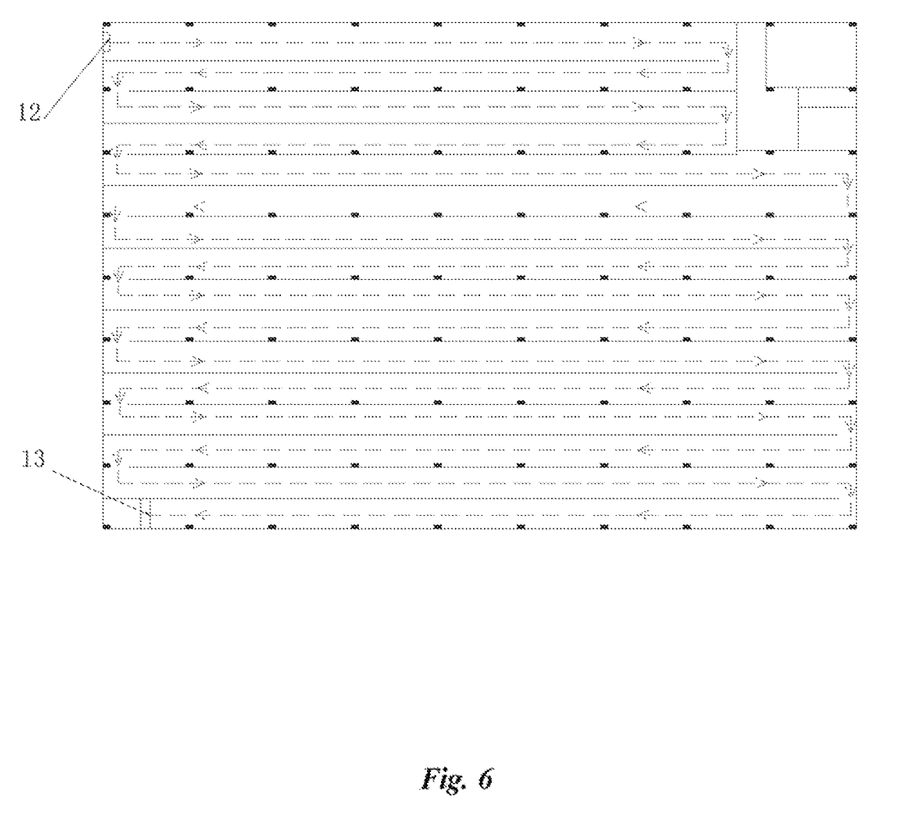
FIG. 6 provides a plan view of one of odd layers of the super-large scale photon capture bioreactor except the first layer, in accordance with embodiments, in accordance with embodiments.

Referring to FIG. 5 and FIG. 6, one of even layers and one of odd layers except the first layer are respectively illustrated. In the first layer, the plurality of biogas digester 18 and the biogas generator set 19 can occupy some space of the first layer. In a horizontal layer above the first layer, water ditch 2 can be arranged necessary passageways for up and down. A water outlet in an upper biological reaction layer can correspond to a water inlet in a next biological reaction layer.

A method for purifying water in accordance with embodiments can be detailed illustrated hereinafter. The process of the method is a gradual biological reaction process from quantitative changes to qualitative changes, therefore, effective factors during the process can be verified. Within the sealable multi-layers structured room, a water ditch 2 allowing water to flow slowly in a roundabout way is arranged in each biological reaction layer. The water ditch 2 can be divided into a plurality of filter units 4 by the microbe filter diaphragms 3. A pore size of the microbe filter diaphragms 3 is configured to be progressively smaller during the purifying process. For example, the microbe filter diaphragms 3 in the first biological reaction layer can be made from ceramic particles with a greater pore size, while the microbe filter diaphragms 3 in the last biological reaction layer can be curtain organic filter with a high-efficiency filtering function. Further, even in a same biological reaction layer, the pore size of the microbe filter diaphragms 3 can be configured to be progressively smaller sequentially along the purifying process. For example, the pore size of preceding arranged microbe filter diaphragms 3 is larger than the pore size of later arranged microbe filter diaphragms 3. Therefore, progressively reinforce purifying can be meet.

After a width and a depth of the water ditch 2 being determined, a size of each filter unit can be determined based on a distance between each two adjacent microbe filter diaphragms 3. Improve purifying can be done by adding the number of the microbe filter diaphragms 3 (that is, to reduce the distance between each two adjacent microbe filter diaphragms 3), or thickening the microbe filter diaphragms 3, or the both.

In usual cases, when concentration of organic pollutants of water COD exceeds 150 mg/L, the water will do harm to plants and aquatic plant can hardly live. During the process of purifying, some purified water can be guided from a last water outlet 13 to the sewage regulation pool 22 to dilute the sewage in the sewage regulation pool 22 until the COD of the sewage of the sewage regulation pool 22 is lower than 150 mg/L (equivalently, dilution of ecological water obtained in a last step of a traditional sewage settlement process being preposed). Therefore, the sewage diluted can be recycled.

Float-planted plants 5 can be terricolous helophyte with fine and developed roots. The fine roots under water can have a length no less than 90 cm. Advantageously, the float-planted plants 5 can be once planted while multi-harvested. Varieties of the floated-planted plants 5 can be adjusted to meet progressive purifying requirements. Likewise, Varieties of the aquatic animals 6 in each filter unit 4 can be adjusted based on progressive purifying requirements. For example, the aquatic animals 6 in the front part of the filter units in the first biological reaction layer can be configured to fit water with greater COD, such as predators including eels, mud fishes, and *Hypophthalmichthys molitrix* which can grew fast in water with greater COD. The aquatic animals 6 in the later filter units can be configured to be filter feeder including bighead.

The microorganisms 7 in each filter unit 4 is naturally growing. When necessary, under some cases, the microorganisms 7 in each filter unit 4 can be inhibited or added artificially.

In general, a preferred height of the plant growth illuminating lights 8 from the plants can be about 50 cm. Therefore, the height of the plant growth illuminating lights 8 can be adjusted to remain 50 cm from the float-planted plants 5 during purifying process. The plant growth illuminating lights 8 can be LED with energy saving and long service life characteristics and can be configured to be a combination of red light and blue light which is best benefit to growth of plants. The plant growth illuminating lights 8 can keep shining on plants all day and all nights so as to induce plants to act photosynthetic reaction to release oxygen. Therefore, plants can grew faster and the efficiency of purifying can be improved.

Adjacent biological reaction layers can be isolated from each other, except that a space for the sink 14.

A height of each biological reaction can be about 2.5 m to 3 m. The depth of the water ditch 2 is about 1.2 m, the height of the plant growth illuminating lights 8 from the plants 5 can preferably be 50 cm. Therefore, the growth height of the plants 5 can preferably be about 1 m to 1.5 m. If a kind of special selected plants 5 with a growth height exceeding 1.5 m is needed, the height of the biological reaction can be increased accordingly.

The amount of water to be purified 9 per unit time, and a height of the super-large scale photon capture bioreactor, together determine a power size of the pump 10. Further, it should be taken into account resistance of the water pipe 11 and delivery head can be increased in order to ensure enough power of the pump 10.

The water to be purified 9 is poured into a water inlet 12 in the uppermost layer. The position where the water to be purified 9 is transported from the water inlet 12 to the water ditch 2 is right on the top of the water surface of the water ditch 2, therefore, the process during which the water to be purified 9 passes from the water inlet 12 to the water ditch 2 can add oxygen.

When the water to purify 9 passes through from the water outlet 13 of the last one of the filter units 4 in a biological reaction layer to the inclined sink 14, the biological reaction at the biological reaction layer is completed. Head difference between the water inlet 12 and the water outlet 13 is small, so as to effectively control the water to be purified 9 flows slowly in a same biological reaction layer to prolong biological reaction time and improve filtering efficiency.

Because the sink 14 is gradually narrowed from top to bottom, water to be purified 9 dropping from the overflow outlet 13 down through the sink 14 can effectively gather potential at an end of the sink 14 which can push the vane wheel 15 to rotate so as to drive the generator 16 to generate electricity. The electricity generated by the generator 16 can supply power to the plant growth illuminating lights 8.

In a same biological reaction layer, when the water to be purified 9 passes from the water inlet 12 to the water outlet 13, it finished passing through all the filter units 4 of the present biological reaction layer, and the water to be purified 9 is purified accordingly. So, the water to be purified 9 has corresponding purified water quality. Then water to be purified 9 having corresponding purified water quality goes through the sink 14 into a water inlet 12 in a next biological reaction layer to continue to deepen the level of progressive filtration and purification process. However, because the water to be purified 9 has already corresponding purified water quality, the float-planted plants 5 and the aquatic animals 6 can be adjusted accordingly so as to meet further purifying requirements.

The closer to the final layer of the bioreactor, the water in the water ditch 2 is getting better. At this time, the microbe filter diaphragms 3 can be curtain organic membrane or the like with highly efficient separation filtering functions. The float-planted plants 5 and the aquatic animals 6 can has better quality and has high economic value.

Each biological reaction layer of the bioreactor is relatively closed, therefore each biological reaction layer can be provided with a carbon dioxide inlet 17. Each biological reaction layer can have a separate valve from which the carbon dioxide can be supplied to the biological reaction layer. The valve can be shut or open according to reaction requirements of the float-planted plants 5. The float-planted plants 5 can act photosynthetic reaction under exposure of the plant growth illuminating lights 8 all day and all night, therefore, adequate carbon dioxide is needed for photosynthetic reaction to fasten growth of the plants 5 and to accelerate the water purification.

Parts of the float-planted plants 5 which cannot directly generate economical value, for example, damaged leaves and roots, as well as defective parts of high-density growing aquatic animals 6, can be gathered into the biogas digesters 18 to generate biogas which can be supplied to the biogas generator set 19 for power generation. The power from the biogas generator set 19 can be supplied to the plant growth illuminating lights 8 and the pump 10. Biogas residue of the biogas digesters 18 can be used for production of organic fertilizer. Biogas slurry of the biogas digesters 18 can be mixed with the water to be purified 9 into the bioreactor 9 to participate water purification.

The biogas generator set 19 generating power with the biogas from the biogas digesters 18 can output carbon dioxide which can be supplied to the carbon dioxide inlet 17 and then can be supplied from the carbon dioxide inlet 17 to the super-large scale photon capture bioreactor.

The solar power system and a wind turbine system 20 outside the outer surface of the super-large scale photon capture bioreactor or on a top surface of the super-large scale photon capture bioreactor can generate power which can be supplied to the plant growth illuminating lights 8 and the pump 10.

Each biological reaction layer of the bioreactor is relatively closed and independent, and each has a natural ventilation orifice 21. Such arrangement is benefit for easy operation, maintenance and management. The super-large scale photon capture bioreactor can be maintained by each layer. Sowing, harvesting, seasonal fishing, equipment replacement and other maintenance measures of one biological reaction layer do not have an impact on other biological reaction layers. At some cases, it will indirectly increase pressure on the next biological reaction layer.

The basement level of the super-large scale photon capture bioreactor is a sewage regulation pool 22. Before flowing into the sewage regulation pool 22, sewage can be physically filtered by the barrier 23 so as to prevent large particle pollution from entering the super-large scale photon capture bioreactor. Anti-leakage measures can be taken with the sewage regulation pool 22 when the super-large scale photon capture bioreactor needs to settle high concentration organic waste.

If the super-large scale photon capture bioreactor is used in water purification or aquaculture, the sewage regulation pool 22 and the barrier 23 can be omitted, and other functional parts can be adjusted accordingly.

Metabolic processes of the float-planted plants 5, the aquatic animals 6 and the microorganisms 7 play a key role during biological reaction process of the super-large scale photon capture bioreactor. The water to be purified 9 acts as reaction solution. There are mainly seven factors anticipating the biological reaction process: nutritional components of the water to be purified 9, the float-planted plants 5, the aquatic animals 6, the microorganisms 7, light illustrated from the plant growth illuminating lights 8, oxygen released and carbon supplied during the photosynthetic reaction. The light, oxygen and carbon dioxide can produce a strong catalytic effect on the biological reaction. The light continuously illustrated from the plant growth illuminating lights 8 all day and all night acts a mainly catalytic factor. The light, oxygen and carbon dioxide in the bioreactor can be continuously recycled (circulation of light is achieved by plants producing biogas for power generation).

The oxygen released during the photosynthetic reaction acts as an important catalytic factor of the biological reaction. The oxygen can enter the water to be purified 9 in three ways to participate the biological reaction. One of the three ways is: the water to be purified 9 drops from each layer to the next layer can generate power and increase oxygen involved in the water to be purified 9. The aquatic animals 6 can obtain enough oxygen and food from the water slowly flowing in the water ditch 2, and can convert nutrient substance of the water to be purified 9 to protein. The second one of the three ways is: when the float-planted plants 5 is illustrated by the lights from the plant growth illuminating lights 8 and act the photosynthetic reaction, roots of the float-planted plants 5 can generate oxygen to be supplied to the water to be purified 9, therefore promoting breeding of the microorganisms 7. The breeding of the microorganisms 7 can accelerate capturing and decomposition great molecules of the water to be purified 9 to generate nutrient substance which can be assimilated directly by the roots of the float-planted plants 5. The last one of the three ways is: when the water to be purified 9 slowly flows in the water ditch 2, the oxygen can be well distributed evenly throughout the course of the bioreactor, thus making the biological reaction more thoroughly.

Since the reaction of the bioreactor is substantially closed, and therefore equilibrium of material and energy exists among the whole biomass of a biologic chain within the bioreactor, the degree of purification of the water to be purified 9 through the bioreactor, and carbon dioxide supplied into the bioreactor. The whole biomass is multiplied due to all kinds of nutrient substance in the water to be purified and supplied carbon dioxide. When the main object of the bioreactor is to purify water, the main product is purified water, while some harvested creatures (including the float-planted plants 5, the aquatic animals 6 are by-product, even though economic value of the by-products in the current circumstances would be greater than the main product to some extent.

APPLICATION EXAMPLES

An application example is illustrated for a three-stage purification treatment project with daily treatment of 10,000 tons which can meet one-class A permitted criteria. According to current common processes, the project will cover an area of about 20,000 square meters, while the super-large scale photon capture bioreactor only covers an area of 3500 square meters (50×70 m). A volume of the super-large scale photon capture bioreactor (a height of the closed building is 15 m) is 3.6 cubic meters (40×60×15). A total investment budget including devices and equipment (such as generators) for the super-large scale photon capture bioreactor can be about 0.230.3 billion (excluding land costs).

Each biological reaction layer has a width of 40 m and a length of 60 m. Each biological reaction layer can build with 20 water ditches each having a depth of 1.2 m, a width of 2 m and a length of 60 m (each layer can be divided evenly into 20 portions). A water inlet of each water ditch is communicated with a water inlet of a next water ditch so as to construct a circuitous water channel with a total length of 1200 m (20 multiplied by 60 m). In the water channel, a microbe filter diaphragms can be provided after each 2 m interval, then the water ditches are separated into 600 filter units each having a volume of 4.8 cubic meters (a length of 2 m, a width of 2 m and a depth of 1.2 m). In each of the 600 filter units, float-planted plants can be planted and the filtering unit 600 inside float planting aquatic plants and aquatic animals can be bred.

Inside the five-story super-large photon capture bioreactor, the water channel has a total length of 6000 m. There are 3000 filter units has a total biological reaction volume of 14400 cubic meters (each filter unit has a volume of 4.8 cubic meters).

Management and maintenance personnel can see the temperature, the humidity, the air inside the reaction layer display of each layer, the humidity, the air inside the reaction layer by control room equipment, and perform management and maintenance according to the operating manual requirements. The height of the plants can see and the height of the plant growth illuminating lights from the plants can be adjusted based on the height of the plants.

Management and operation of the super-large scale photon capture bioreactor need 20 people (three shifts, 24 hours). Under a condition that an average annual pay is 36 thousands yuan, the annual labor cost is about 0.72 million yuan. If cost for auxiliary power, transportation, equipment maintenance and other expenses amount to 1.56 million yuan, the total annual operating costs can be about 2.28 million yuan. If the project with daily treatment of 10,000 tons is performed in accordance with current conventional technology processes, the annual operating expenses amount to about 3.65 million yuan. Since the super-large scale photon capture bioreactor can utilize water-head due to the water to be purified dropping through the sink, biogas generated based on creatures, solar and wind power system outside the bioreactor to generate power. The power generated by the bioreactor can basically meet its own power consumption requirements. The super-large scale photon capture bioreactor can only need ten percent outside power supply that is needed by the traditional methods. The super-large scale photon capture bioreactor can reduce operation cost of about 1.37 million yuan per year than traditional methods.

The super-large scale photon capture bioreactor can create economic benefits during its operational process. The float-planted plants for biological reaction can cover an area of about 8000 square meters. Each square meter can produce float-planted plants having a weight of about 40 kg (parts above the embedded planting plate about 20 kg, parts below the embedded planting plate about 20 kg). Under a condition that the parts above the embedded planting plate cost 5 yuan per kilogram, economic value of the float-planted plants per square meter is 100 yuan. Each year, the float-planted plants for sale can have a weight of 160 tons and can create 0.8 billion yuan. The water for breeding aquatic products can be about 10,000 cubic meters. Under a condition that each cubic meter water can output 100 kilograms aquatic products and per kilograms of aquatic products can worth 6 yuan (can be used to produce high added-value concentrated organic fertilizer), the annual output of the aquatic products can up to 6 billion yuan. The super-large scale photon capture bioreactor can create gross revenue of 680 million yuan per year. However, the traditional method can not only generate economic benefits, but also need to add cost for following sludge treatment.

It should be noted that the above embodiments are only used to illustrate specific aspect of the present invention, not limitation, although with reference to the preferred embodiment of the present invention has been described in detail, those skilled in the art will appreciate that the present invention can be technical program modifications or equivalent substitutions without departing from the spirit and scope of the present invention, technical solution, which should be covered by the present invention in which the rights of the required range.

What is claimed is:

1. A photon capture bioreactor for water purification, comprising: a sealable three-dimensional room, a water pipe, and a generator; a plurality of planar layers being provided inside the three-dimensional room, each being mounted with water ditches in a circuitous way; the water ditches in a same planar layer having a water inlet and water outlet; a plurality of microbe filter diaphragms being arranged in the water ditches at intervals, and a filter unit being formed between two adjacent microbe filter diaphragms; float-planted plants being provided on water surface of each filter unit, microorganisms being bred underwater, plant growth illuminating lights being arranged above the float-planted plants at an adjustable height; a vane wheel being arranged under a water outlet of the water ditches in an upper layer and being connected with the generator; a water inlet of the water ditches in a next layer being arranged under the vane wheel; water to be purified being guided to a water inlet at an uppermost layer through the water pipe.

2. The photon capture bioreactor of claim 1, further comprising carbon dioxide supply pipes communicating with the three-dimensional room.

3. The photon capture bioreactor of claim 2, wherein each planar layer is relatively closed and is constructed with a retractable natural ventilation orifice.

4. The photon capture bioreactor of claim 1, wherein a drop sink is arranged between two adjacent planar layers, an upper end of the sink being connected with a water outlet of an upper layer, and the vane wheel being arranged under a lower end of the sink.

5. The photon capture bioreactor of claim 4, wherein a pump is provided for driving water to be purified in a water pool to the water inlet of the uppermost layer through the water pipe.

6. The photon capture bioreactor of claim 1, wherein aquatic animals are bred underwater in the filter units.

7. The photon capture bioreactor of claim 4, wherein the sink is gradually narrowed from top to bottom.

8. The photon capture bioreactor of claim 1, wherein the bioreactor comprises a plurality of biogas digesters and biogas generator sets at a ground layer.

9. The photon capture bioreactor of claim 1, wherein a sewage regulation pool with anti-leakage measures is arranged at a subterranean lay of the bioreactor, and swage is physically filtered by a barrier before entering the sewage regulation pool.

10. An operation method of the photon capture bioreactor of claim 1, wherein the method comprising:

diluting water to be purified to a predefined concentration in a sewage regulation pool, driving water of the sewage regulation pool through the water pipe to the water inlet at an upmost layer inside the dimensional room by a pump so as to have the water to enter the water ditches in a circuitous configuration and to flow in the water ditches, water to be purified passing through the filter units sequentially at the upmost layer and the water to be purified being gradually filtered by the filter units, then the water to be purified flowing from a water outlet of the last filter unit to enter an upper end of a drop sink, the water to be purified dropping down the drop sink and pushing the vane wheel to rotate at a lower end of the sink, rotation of the vane wheel driving the generator to generate power to be supplied to the plant growth illuminating lights; the water to be purified being added oxygen through the vane wheel and entering a water inlet at a next layer; and so on, the water to be purified being turned into purified water after passing through ditches at a lowest layer;

float-planting plants at each filter unit, the float-planted plants acting photosynthesis under illumination of the plant grown illuminating lights to absorb part of nutrient substance and carbon dioxide in air, the microorganism utilizing part of nutrient substance in the water to perform biological reaction, aquatic animals eating parts of roots of the float-planted plants and phytoplankton in the water, at the same time when the water is purified, plants capable of being harvested and the aquatic animals being obtained.

* * * * *